United States Patent
Speicher et al.

(10) Patent No.: US 9,521,679 B2
(45) Date of Patent: Dec. 13, 2016

(54) SYSTEMS AND METHODS FOR IMPLEMENTING REFLECTIVE EPS BEARERS TO ENSURE UPLINK QUALITY OF SERVICE

(71) Applicant: Cisco Technology, Inc., San Jose, CA (US)

(72) Inventors: Sebastian Speicher, Wallisellen (CH); Nirav Salot, Pune (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 94 days.

(21) Appl. No.: 14/199,277

(22) Filed: Mar. 6, 2014

(65) Prior Publication Data
US 2015/0257159 A1 Sep. 10, 2015

(51) Int. Cl.
*H04W 28/10* (2009.01)
*H04W 72/04* (2009.01)
*H04W 76/02* (2009.01)
*H04W 28/02* (2009.01)
*H04W 72/08* (2009.01)
(Continued)

(52) U.S. Cl.
CPC ..... *H04W 72/0486* (2013.01); *H04W 28/0252* (2013.01); *H04W 28/0268* (2013.01); *H04W 28/10* (2013.01); *H04W 76/02* (2013.01); H04L 47/14 (2013.01); H04L 47/2441 (2013.01); *H04W 72/08* (2013.01); *H04W 72/087* (2013.01)

(58) Field of Classification Search
CPC ............. H04W 28/0268; H04W 28/10; H04W 72/087; H04W 76/02; H04W 76/022; H04W 76/027; H04L 47/14; H04L 47/2441
See application file for complete search history.

(56) References Cited

U.S. PATENT DOCUMENTS

| | | | |
|---|---|---|---|
| 2014/0233380 A1* | 8/2014 | Kim | H04W 28/24 370/230 |
| 2015/0063101 A1* | 3/2015 | Touati | H04W 72/087 370/230 |
| 2015/0139085 A1* | 5/20 | Kaczmarska-Wojtania | H04L 5/0053 370/329 |

FOREIGN PATENT DOCUMENTS

WO WO2010/112077 10/2010
WO WO2013/174422 11/2013

OTHER PUBLICATIONS

EPO Jul. 24, 2015 Search Report and Written Opinion from European Application Serial No. 15152750.4.

* cited by examiner

*Primary Examiner* — Raj Jain
(74) *Attorney, Agent, or Firm* — Patent Capital Group

(57) ABSTRACT

The present disclosure is directed at systems, methods and media for providing QoS differentiation between IP data flows by sorting data packets into bearers. If a first node in a communication network (e.g., a User Equipment or UE) determines that downlink packets received from a second node (e.g., a Packet Data Network Gateway or PDN-GW) via a specific bearer should be given reflective bearer treatment, the first node can be configured to send uplink packets back to the second node via the same bearer. By sending uplink traffic using the same bearer as downlink traffic, the first node can aid in ensuring that the correct QoS for the uplink traffic is used. Downlink packets or bearers can be configured to request reflective bearer treatment through reserved QoS Class Identifier (QCI) values, Allocation and Retention Priority (ARP) values, or through an indicator specifically defined for requesting such treatment.

20 Claims, 9 Drawing Sheets

(51) Int. Cl.
*H04L 12/801* (2013.01)
*H04L 12/851* (2013.01)

SYSTEMS AND METHODS FOR IMPLEMENTING REFLECTIVE EPS BEARERS TO ENSURE UPLINK QUALITY OF SERVICE

FIELD OF THE DISCLOSURE

This disclosure relates generally to systems, methods, and media for providing Quality of Service (QoS) differentiation in wireless network communications.

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many user equipment, including, for example, satellite communications systems, portable digital assistants (PDAs), laptop computers, and mobile devices (e.g., cellular telephones). One benefit that users of such devices can obtain is the ability to connect to a network (e.g., the Internet) as long as the user is within range of such a wireless communication technology. Current wireless communication systems use either, or a combination of, circuit switching and packet switching in order to provide mobile data services to mobile devices. Generally speaking, with circuit-based approaches, wireless data is carried by a dedicated (and uninterrupted) connection between the sender and recipient of data using a physical switching path. Packet-based approaches, on the other hand, typically do not permanently assign transmission resources to a given session, and do not require the set-up and tear-down of physical connections between a sender and receiver of data. In general, a data flow in packet-based approaches is divided into separate segments of information or packets. The data flow may include a number of packets or a single packet.

Data flows can be assigned different Quality of Service (QoS) levels. In the networking context, QoS refers to the overall performance of a telephony or computer network, particularly the performance seen by the users of the network. To quantitatively measure quality of service, several related aspects of the network service can be considered, such as error rates, bandwidth, throughput, transmission delay, availability, jitter, etc. Appropriately assigning QoS is useful for the transport of network traffic with special requirements. For example, time-sensitive network traffic related to video conferencing, audio streaming or video streaming applications may require different QoS from that for network traffic related to less time-sensitive applications such as emails or texting.

Existing 3rd Generation Partnership Project (3GPP) approaches to providing QoS differentiation are based on the concept of routing different IP packets into different bearers. A 3GPP Long Term Evolution (LTE) network is a connection-oriented transmission network and, as such, requires the establishment of a "virtual" connection between two endpoints, such as between a User Equipment (UE) and a Packet Data Network Gateway (PDN-GW). This virtual connection is called an "EPS Bearer." "EPS" stands for "Evolved Packet System." An EPS bearer can be characterized by:

An Allocation Retention Priority (ARP)—this parameter refers to the priority used for the allocation and retention mechanisms. ARP is typically used for the allocation of the bearer resources at session startup or during handover mechanisms and can also be used for deciding which bearers need to be preserved in case of a congestion situation. Once the bearer is established, the ARP typically has no impact on scheduling or packet-handling mechanisms.

Guaranteed Bit Rate (GBR)—this parameter is only applicable to bearers which require guaranteed QoS for services such as voice or streaming.

Maximum Bit Rate (MBR)—this parameter is used to set a limit on the data rate expected for the related service. In case the observed bit rate exceeds this limit, the EPS network can limit the effective rate by applying traffic-shaping functions.

QoS Class Identifier (QCI)—this parameter is used as a reference to a set of Access Network-related QoS parameters. This parameter can be a scalar number, and each QCI level can be associated with a different Packet Delay Budget value and Packet Loss Rate value, as well as other QoS related parameters. Presently, the LTE standard defines nine separate QCI levels. Higher QCI can be used for high demand applications such as real time gaming or video streaming, while lower QCI can be used for lower-demand applications such as best effort TCP bulk data.

DESCRIPTION OF EXAMPLE EMBODIMENTS

Overview

Figure 1:
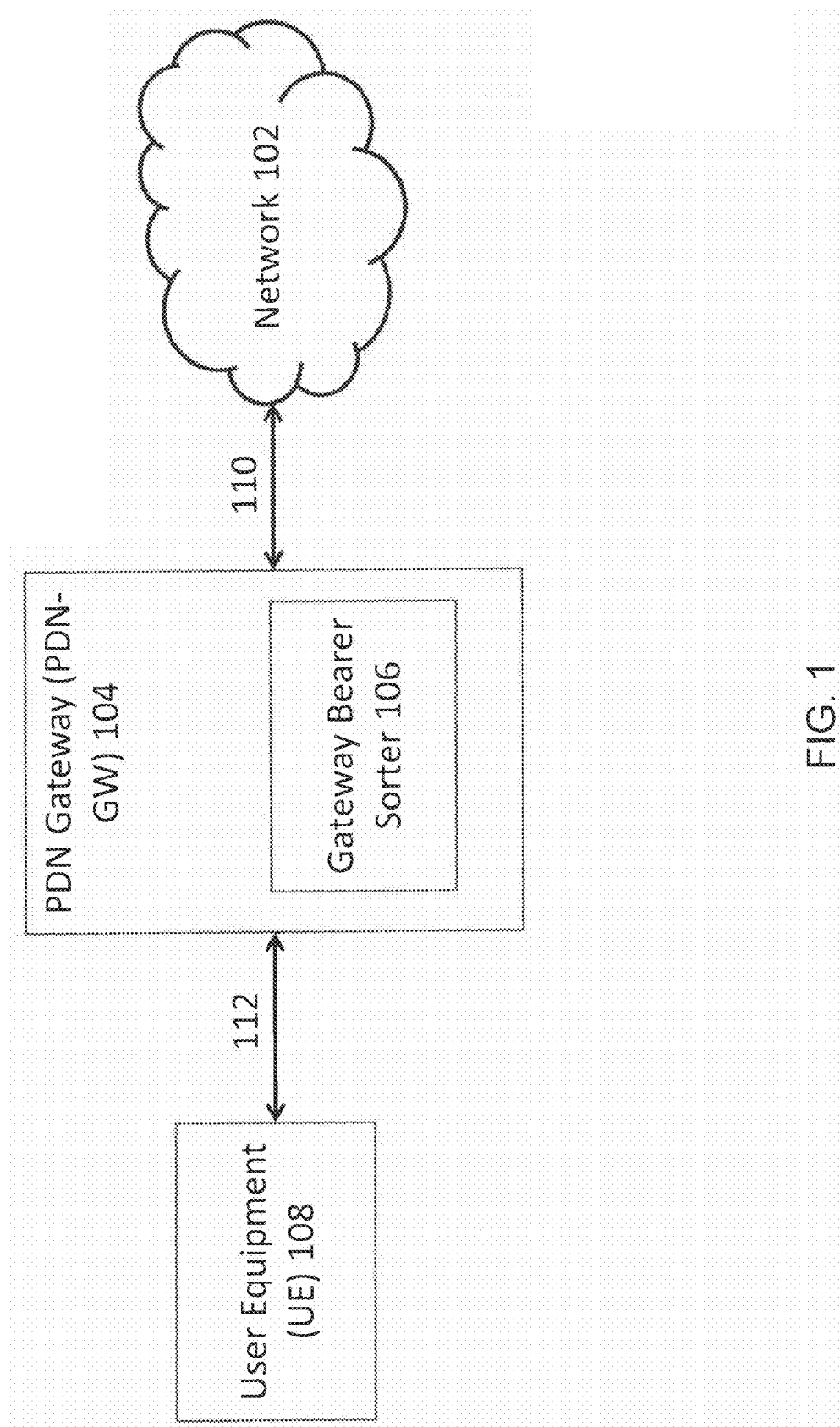
FIG. 1 is a block diagram showing communication channels between a network, a PDN-GW and a UE, according to some embodiments.

The present disclosure is directed at systems and methods for implementing reflective EPS bearers to ensure uplink Quality of Service (QoS).

In one aspect, the present disclosure is directed at a network apparatus configured to sort packet data flows into bearers. The network apparatus can comprise an interface configured to send at least one downlink packet via a bearer to a counterpart apparatus. The network apparatus can also comprise a computer processor in communication with the interface and configured to determine that the downlink packet should request reflective bearer treatment at the counterpart apparatus, in which uplink packets associated with the downlink packet are sent from the counterpart apparatus via the same bearer as the downlink packet, and based on the determination, configure the bearer to request reflective bearer treatment.

In some embodiments, the computer processor of the network apparatus can be further configured to determine that the downlink packet should request reflective bearer treatment based on a rate at which an application associated with the downlink packet creates new traffic flows.

In some embodiments, the computer processor of the network apparatus can be further configured to determine that the downlink packet should request reflective bearer treatment when an application associated with the downlink packet cannot be represented using Traffic Flow Templates (TFTs), the TFTs comprising rules that sort packets into bearers based on information in packets' headers.

In some embodiments, the computer processor of the network apparatus can be further configured to determine that the downlink packet should request reflective bearer treatment when an application associated with the downlink packet is configured to use the same Internet Protocol (IP) address, port, and protocol type for downlink traffic and uplink traffic.

In some embodiments, the computer processor of the network apparatus can be further configured to configure the bearer to request reflective bearer treatment by changing at least one of a QoS Class Identifier (QCI) parameter and an Allocation and Retention Priority (ARP) parameter.

In some embodiments, the computer processor of the network apparatus can be further configured to: determine that a second downlink packet should not be configured to request reflective bearer treatment; and determine which bearer via which the second downlink packet should be sent based on a set of Traffic Flow Templates (TFTs), the TFTs comprising rules that sort packets into bearers based on information in packets' headers.

In some embodiments, the network apparatus can comprise a Packet Data Network Gateway (PDN-GW), and the counterpart apparatus includes a User Equipment (UE).

In another aspect, the present disclosure is directed at a method for sorting packet flows into bearers, the method comprising: sorting, at a network apparatus, a downlink packet for a counterpart apparatus into a bearer; determining, at the network apparatus, that the downlink packet should request reflective bearer treatment at the counterpart apparatus, in which uplink packets associated with the downlink packet are sent from the counterpart apparatus via the same bearer as the downlink packet; and based on the determination, configuring the bearer to request reflective bearer treatment.

In some embodiments, the determination can be based on a rate at which an application associated with the downlink packet creates new traffic flows.

In some embodiments, the determination can be based on whether an application associated with the downlink packet can be represented using Traffic Flow Templates (TFTs), the TFTs comprising rules that sort packets into bearers based on information in packets' headers.

In some embodiments, the determination can be based on whether an application associated with the downlink packet is configured to use the same Internet Protocol (IP) address, port, and protocol type for downlink traffic and uplink traffic.

In some embodiments, the method can further comprise: determining, at the network apparatus, that a second downlink packet should not request reflective bearer treatment; and determining which bearer via which the second downlink packet should be sent based on a set of Traffic Flow Templates (TFTs), the TFTs comprising rules that sort packets into bearers based on information in packets' headers.

In some embodiments, the network apparatus can include a Packet Data Network Gateway (PDN-GW), and the counterpart apparatus includes a User Equipment (UE).

In another aspect, the present disclosure is directed at an end user apparatus configured to receive packet data flows. The end user apparatus can comprise an interface configured to receive at least one downlink packet via a bearer. The end user apparatus can also comprise a bearer detector module configured to determine that the downlink packet should be given reflective bearer treatment; and a bearer sorter module configured to send, based on the determination that the downlink packet should be given reflective bearer treatment, an uplink packet associated with the downlink packet via the same bearer over which the apparatus received the downlink packet.

In some embodiments, the end user apparatus can further comprise a memory storing a bearer list. The bearer detector module can be further configured to determine a source port, a source IP address, and a protocol type associated with the downlink packet, and to save an entry in the bearer list, the entry comprising the source port, the source IP address, the protocol type associated with the downlink packet, and a bearer ID associated with the bearer. The bearer sorter module can also be further configured to send, based on the determination, the uplink packet via the same bearer, including: determine that a destination port, a destination IP address, and a protocol type associated with the uplink packet match the source port, the source IP address, and the protocol type associated with the downlink packet saved in the entry, and send the uplink packet via the bearer associated with the bearer ID.

In some embodiments, the entry saved in the bearer list can further comprise a time stamp indicating the time at which a last packet associated with the source port, the source IP address, and the protocol type associated with the downlink packet was received. The end user apparatus can also be further configured to delete from the bearer list entries whose time stamps are older than a predetermined threshold.

In some embodiments, the bearer detector module can be further configured to determine that the downlink packet should be given reflective bearer treatment by determining whether a parameter associated with the bearer corresponds to a set of at least one value reserved for requesting reflective bearer treatment.

In some embodiments, the parameter associated with the bearer can be a QoS Class Identifier (QCI) parameter or an Allocation and Retention Priority (ARP) parameter.

In some embodiments, the bearer detector module can be further configured to determine that a second downlink packet should not be given reflective bearer treatment. If so, the bearer sorter module can be configured to determine which bearer via which a second uplink packet associated with the second downlink packet should be sent based on a set of Traffic Flow Templates (TFTs), the TFT comprising rules that sort packets into bearers based on information in packets' headers.

In another aspect, the present disclosure is directed at a method for sorting packet data flows into bearers. The method can comprise receiving, via an interface, at least one downlink packet via a bearer; determining, in a computer processor, that the downlink packet should be given reflective bearer treatment; and sending, via the interface and based on the determination that the downlink packet should be given reflective bearer treatment, an uplink packet associated with the downlink packet via the same bearer over which the downlink packet was received.

In some embodiments, the method can further comprise storing, in a memory, a bearer list; determining, in the computer processor, a source port, a source IP address, and a protocol type associated with the downlink packet; saving an entry in the bearer list, the entry comprising the source port, the source IP address, the protocol type associated with the downlink packet, and a bearer ID associated with the bearer; and determining, in the computer processor, that a destination port, a destination IP address, and a protocol type associated with the uplink packet match the source port, the source IP address, and the protocol type associated with the downlink packet saved in the entry. The sending of the uplink packet via the same bearer can comprise sending the uplink packet via the bearer associated with the bearer ID.

In some embodiments, the entry can further comprise a time stamp indicating the time at which a last packet associated with the source port, the source IP address, and the protocol type associated with the downlink packet was received. The method can further comprise deleting from the bearer list entries whose time stamps are older than a predetermined threshold.

In some embodiments, determining that the downlink packet should be given reflective bearer treatment can include determining whether a parameter associated with the bearer corresponds to a set of at least one value reserved for requesting reflective bearer treatment. The parameter can be a QoS Class Identifier (QCI) parameter, an Allocation and Retention Priority (ARP) parameter, or an indicator specifically defined for requesting reflective bearer treatment.

In some embodiments, the method can further comprise determining that a second downlink packet should not be given reflective bearer treatment; and determining which bearer via which a second uplink packet associated with the second downlink packet should be sent based on a set of Traffic Flow Templates (TFTs), the TFT comprising rules that sort packets into bearers based on information in packets' headers.

Overview

Since EPS bearers can be configured with different QoS parameters, different IP packets can be routed into and transported via different bearers, so that the IP packets receive the requested QoS treatment. It would be useful to efficiently route network traffic passing between network nodes, such as the UE and the PDN-GW, into the appropriate EPS bearer so that the appropriate QoS can be applied.

FIG. 1 shows the interaction between Network 102, PDN-GW 104 and UE 108. While the Figures and descriptions in the present disclosure are directed at the interactions between a PDN-GW and a UE, it is to be understood that all the routing mechanisms described herein are equally applicable to network traffic between other network nodes. PDN-GW 104 is in communication with Gateway Bearer Sorter module 106, which serves to analyze and sort data streams into the appropriate EPS bearers, both in the uplink direction (i.e., traffic passing from UE 108 to Network 102) and in the downlink direction (i.e., traffic passing from Network 102 to UE 108). For example, Gateway Bearer Sorter 106 can be implemented as a Policy Charging Enforcement Function (PCEF) enhanced with Application Detection and Control (ADC), and integrated as a functional entity inside PDN-GW 104.

Gateway Bearer Sorter 106 can accomplish its function in different ways. One approach is to use Traffic Flow Templates (TFTs). TFTs are essentially rules that sort IP packets into bearers based on information in the IP packet's header, such as source IP, source port, destination port, DSCP/TOS, etc. TFTs can be installed in Gateway Bearer Sorter 106 and can also be signaled towards the UE so that both entities can use the TFTs to route IP packets in both the downlink and uplink direction into the assigned bearers.

However, there are certain scenarios in which it can be difficult to create TFTs and/or to signal TFTs to the UEs. These scenarios can include:

Highly dynamic applications/protocols: Some applications consistently create many new IP flows (i.e., traffic to new IP address/port combinations) at a rapid pace. An example of just such an application would be highly dynamic protocols used for peer-to-peer file sharing applications. In order to ensure that the new IP flows are treated with the QoS appropriate for the application, the TFTs in both the PDN-GW and the UE would need to be updated just as rapidly. If the rate of new flows being created by an application is faster than the typical time it takes to update TFTs in the UE, then it can become very difficult to provide uplink QoS differentiation for such an application. Even if it were possible to update the TFTs rapidly enough to keep up with the new flows, the rapid TFT updates would still lead to a significant amount of signaling traffic. Another challenge is that the TFTs that can be signaled to a UE are limited in number, which also limits the amount of IP flows that can be separated into different bearers in the uplink direction.

Protocol complexity: Some applications use complex protocols that can only be detected by Deep Packet Inspection (DPI) engines, but cannot be adequately described or detected by TFTs. For instance, Skype, which is a video conferencing application, uses the same ports that are used for web chatting, even though the two applications require different QoS. As a result, it can be difficult to differentiate between Skype data streams and normal web chatting data streams using TFTs alone. In such cases, DPI analysis is used to sort packets into the appropriate bearers, and this DPI analysis can either be conducted by Gateway Bearer Sorter 106, or by a Traffic Detection Function (TDF) (not shown) implemented on a device separate from or integrated with Gateway Bearer Sorter 106 and PDN-GW 104. In the latter case, the TDF can be configured to perform DPI and mark packets with a specific marking representing a specific application—Gateway Bearer Sorter 106 can then read the marking and use it to sort traffic into the right bearer. In either case, however, this analysis can be time-consuming and resource intensive.

"Reflective" EPS bearers can be used to sort traffic into the appropriate EPS bearer in the uplink direction. In some embodiments, a UE can be configured to derive the uplink bearer via which to send a packet to a destination on the network based on the downlink bearer via which the UE received a packet from a source on the network. In other words, if a UE receives packets from IP address A and port B, using protocol type C, and via bearer D, then the UE can be configured to send packets to IP address A and port B, using protocol type C, also via bearer D.

A UE configured to use reflective EPS bearers assumes that the network has sorted downlink packets belonging to a given application into a specific bearer for a reason, i.e., that the bearer has been configured with the appropriate QoS characteristics for this application. Because the UE assumes that the downlink bearer is already configured with the appropriate QoS, the UE can ensure that this application's uplink traffic is also conveyed via the same bearer. This in turn ensures that an application's uplink traffic (to the same destination) is also transported with the appropriate QoS.

Using reflective EPS bearers can be useful in situations where TFTs are not adequate, as discussed above. If for example, an application is creating new traffic flows at a rapid rate, using reflective EPS bearers can obviate the need for TFTs to be frequently updated. If an application's traffic cannot be detected except using DPI, using reflective EPS bearers can obviate the need for a UE to perform DPI in order to sort uplink packets into the appropriate bearers. Furthermore, even in situations where TFTs can adequately describe and capture rules to sort packets into bearers, using reflective EPS bearers can still be desirable because it obviates the need for PDN-GW 104 to signal updated TFTs to UE 108, thereby decreasing unnecessary signal traffic.

Reflective EPS bearers can also be used in other situations. Another example is the case where the radio network is congested, and an operator may want to limit the radio resources for specific services by establishing a specific bearer with "low" QoS and pushing the packets of those services into this bearer. By using reflective EPS bearers, an operator would ensure that these services do not also consume too much resources in the uplink direction. Also, by applying reflective EPS bearers, a network operator can obviate the need for UEs to perform DPI, which in most cases is required to detect the services. In certain embodiments, an operator may also want to tailor whether reflective EPS bearers are applied based on the subscriber type. For example, if the network becomes congested and the packets associated with a service is pushed into a specific bearer with "low" QoS, an operator may not want to lower the QoS for the same service for specific subscribers that belong to a certain premium category (e.g., "gold" subscribers).

Figure 2:
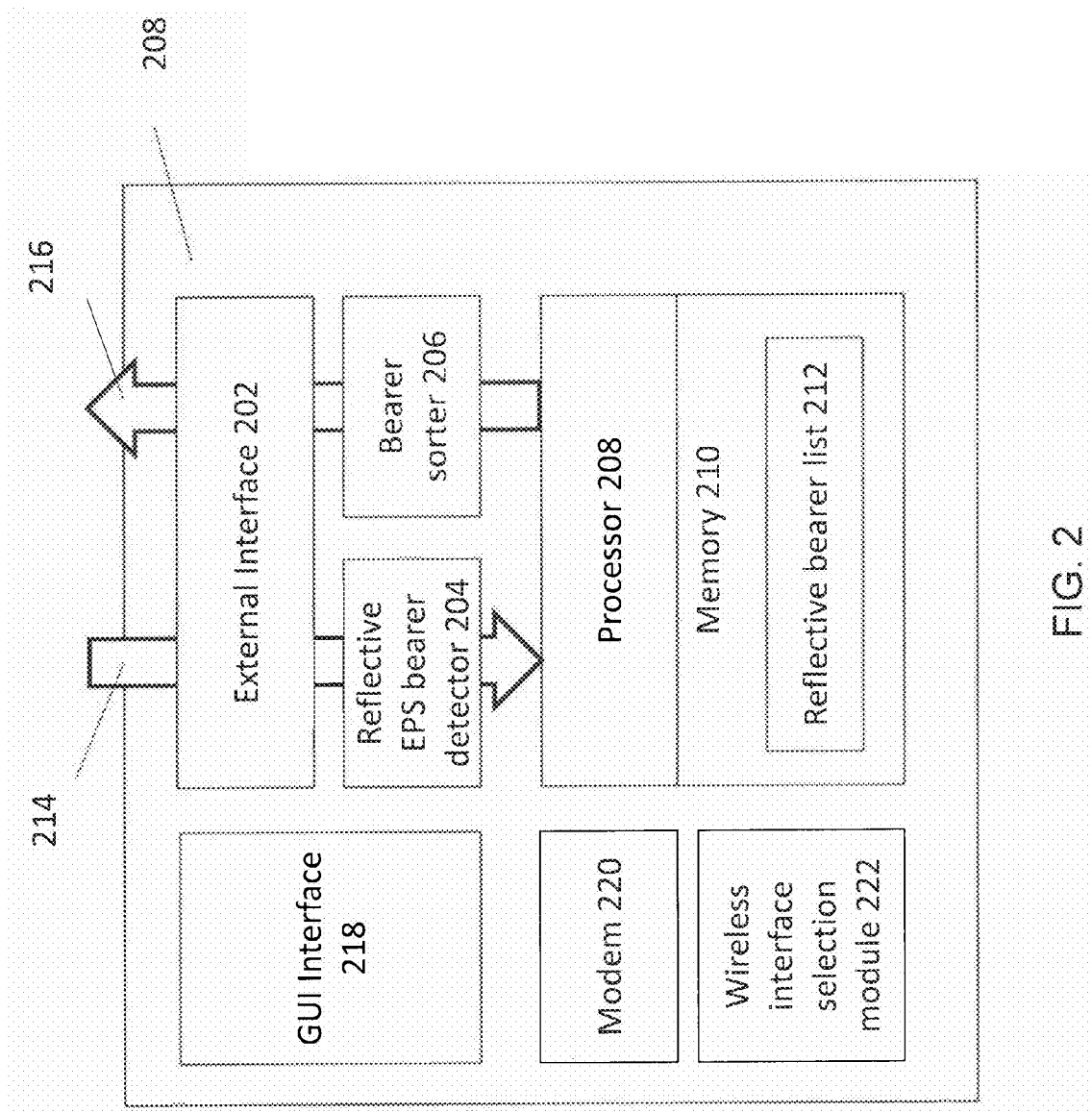
FIG. 2 is a logical diagram of a UE configured to provide reflective EPS bearer treatment to received packets, according to some embodiments.

FIG. 2 illustrates an example UE 108 in more detail, according to some embodiments. UE 108 can include an external interface 202, which sends and receives data packet traffic via downlink data stream 214 and uplink data stream 216. UE 108 can also include Reflective EPS bearer detector 204, Processor 208, Memory 210, Bearer Sorter 206, GUI interface 218, Modem 220 and Wireless Interface Selection Module 222. Memory 210 can store Reflective Bearer List 212, which contains a list of 3-tuples (source port, source IP, protocol type) of known data streams and EPS bearers that have requested reflective bearer treatment, and a mapping of these 3-tuples to different EPS bearers with different EPS bearer IDs. A protocol type can be specified in an IPv4 or IPv6 header, and can include TCP or UDP protocols, as well as other protocols used for communication packets. While Reflective EPS bearer detector 204, Bearer Sorter 206, GUI interface 218, Modem 220 and Wireless Interface Selection Module 222 are illustrated as separate from Processor 208 and Memory 210, it is to be understood that any of these components may be implemented in either hardware or software. If these components are implemented in hardware, any combination of these components and/or Processor 208, Memory 210 and External Interface 202 can be implemented as separate components or may be integrated onto the same integrated circuit or chip. These components may also be implemented as software instances running on Processor 208. The operation of each component is further described in relation to the flow-charts depicted in FIGS. 3 and 4.

Figure 3:
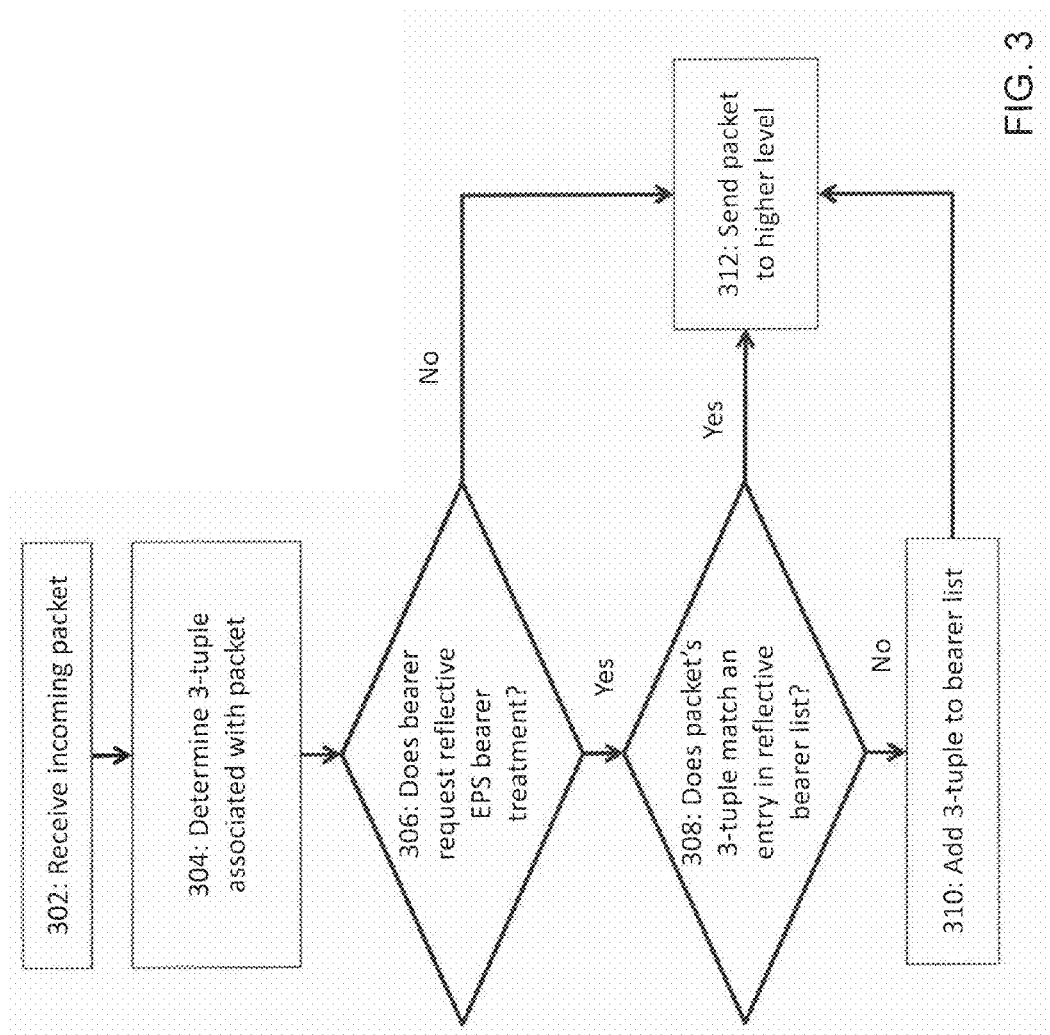
FIG. 3 is a flow-chart illustrating the procedure used by a UE to handle received packets, according to some embodiments.

FIG. 3 is a flow-chart illustrating a procedure followed by UE 108 when receiving an incoming packet. In step 302, UE 108 receives an incoming packet via downlink data stream 214 and external interface 202. In step 304, Reflective EPS Bearer Detector 204 can detect a 3-tuple associated with the packet, i.e., the packet's source port, source Internet Protocol address (IP), and protocol type. In step 306, Reflective EPS Bearer Detector 204 can detect whether the EPS bearer via which the packet was received is marked for reflective EPS bearer treatment. Further details regarding how an EPS bearer can be marked for reflective bearer treatment are discussed further below. If the packet is not marked for reflective treatment, Reflective EPS Bearer Detector 204 will not do anything further, but will send the packet to a higher processing layer for processing in step 312, potentially in processor 208. If the packet is marked for reflective treatment, the Reflective EPS Bearer Detector 204 can, in step 308, determine whether the packet's 3-tuple matches an existing entry in Reflective Bearer List 212. If an existing entry is found, Reflective EPS Bearer Detector 204 can send the packet to a higher processing layer for processing in step 312. If, however, no existing entry is found, Reflective EPS Bearer Detector 204 can add, in step 310, the 3-tuple detected in step 304 as well as the ID of the EPS bearer via which the packet was received to the Bearer List 212. The Reflective EPS Bearer Detector 204 can then send the packet to a higher processing layer in step 312.

Figure 4:
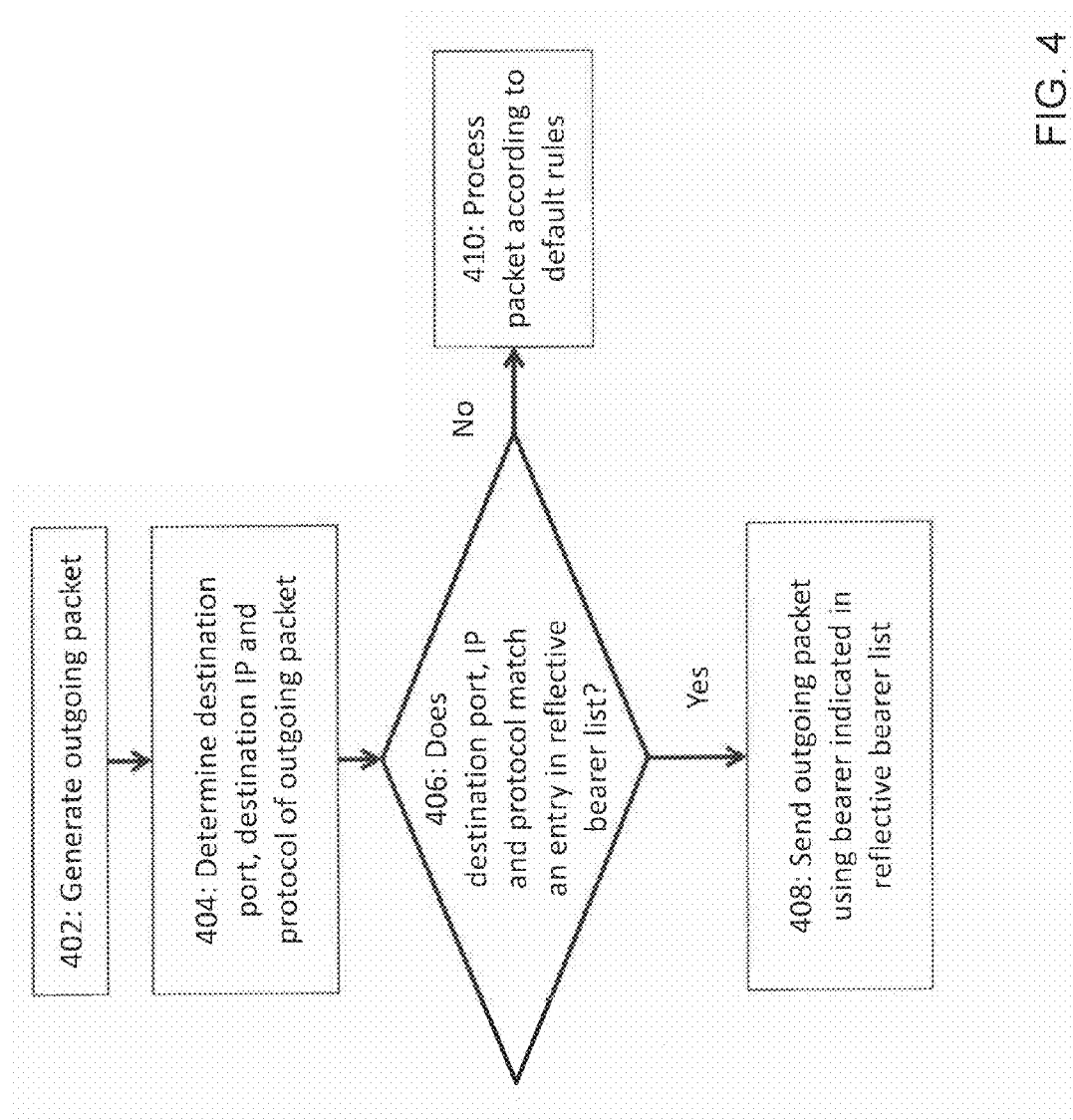
FIG. 4 is a flow-chart illustrating the procedure used by a UE to send outgoing packets, according to some embodiments.

FIG. 4 is a flow-chart illustrating the procedure followed by UE 108 when sending an outgoing packet. In step 402, UE 108 can generate an outgoing packet, perhaps using a higher processing layer in processor 208. In step 404, Bearer Sorter 206 can determine the destination port, destination IP and protocol type of the outgoing packet. In step 406, Bearer Sorter 206 can determine whether the destination port, destination IP and protocol type match an entry in Reflective Bearer List 212. If there is a matching 3-tuple detected in the Bearer List 212 (i.e., there is a 3-tuple with the same port, IP and protocol type), Bearer Sorter 206 can send, in step 408, the outgoing packet using the EPS bearer identified by the EPS Bearer ID associated with the matching 3-tuple. On the other hand, if there is no matching 3-tuple detected, Bearer Sorter 206 can process the outgoing packet according to a default set of rules, in step 410. These default rules can include sorting packets using TFTs signaled to UE 108 by PDN-GW 104, as described above in relation to FIG. 1.

Figure 5:
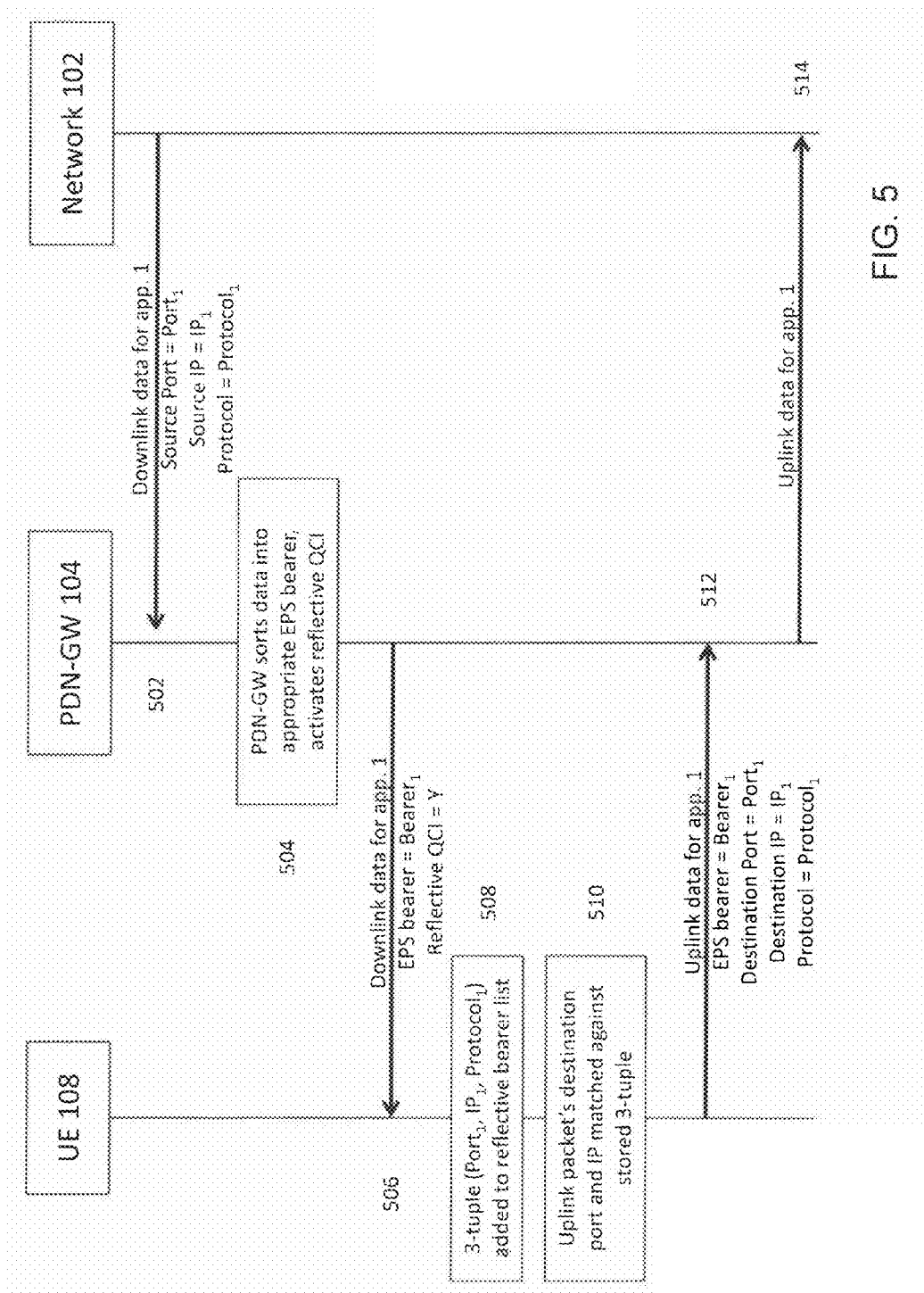
FIG. 5 is a signaling diagram showing a signal flow between a network, a PDN-GW and a UE when reflective bearer treatment is requested, according to some embodiments.

FIG. 5 is a signaling diagram showing a signal flow when reflective bearer treatment is requested. Network 102 sends a stream of at least one packet associated with downlink data for application 1 to PDN-GW 104 at 502. This stream of packets is characterized by a source port value of $Port_1$, a source IP address of $IP_1$ and a protocol type of $Protocol_1$. At 504, PDN-GW 104 sorts the downlink data stream for application 1 into the appropriate EPS bearer, and requests reflective bearer treatment (as further described below). PDN-GW 104 can sort the downlink data stream using Gateway Bearer Sorter 106 and TFTs, as described above. At 506, PDN-GW 104 can forward the downlink data stream using EPS $Bearer_1$, wherein the Reflective QCI marker for EPS $Bearer_1$ is marked "yes." At 508, UE 108 detects the 3-tuple associated with the downlink data for application 1 ($Port_1$, $IP_1$, $Protocol_1$), and adds an additional entry in Reflective Bearer List 212 associating this 3-tuple with the ID for EPS Bearer$_1$. When UE 108 generates and sends a responding packet at 510, UE 108 matches the uplink packet's destination port, IP and protocol type against the stored 3-tuples in the Reflective Bearer List 212. Since the destination port (Port$_1$), the destination IP (IP$_1$) and the protocol type (Protocol$_1$) match against a stored entry in Reflective Bearer List 212, UE 108 can send uplink data for application 1 via Bearer$_1$, as indicated at 512. At 514, PDN-GW 104 can then forward the uplink data, addressed to Port$_1$ and IP$_1$, to Network 102.

Figure 6:
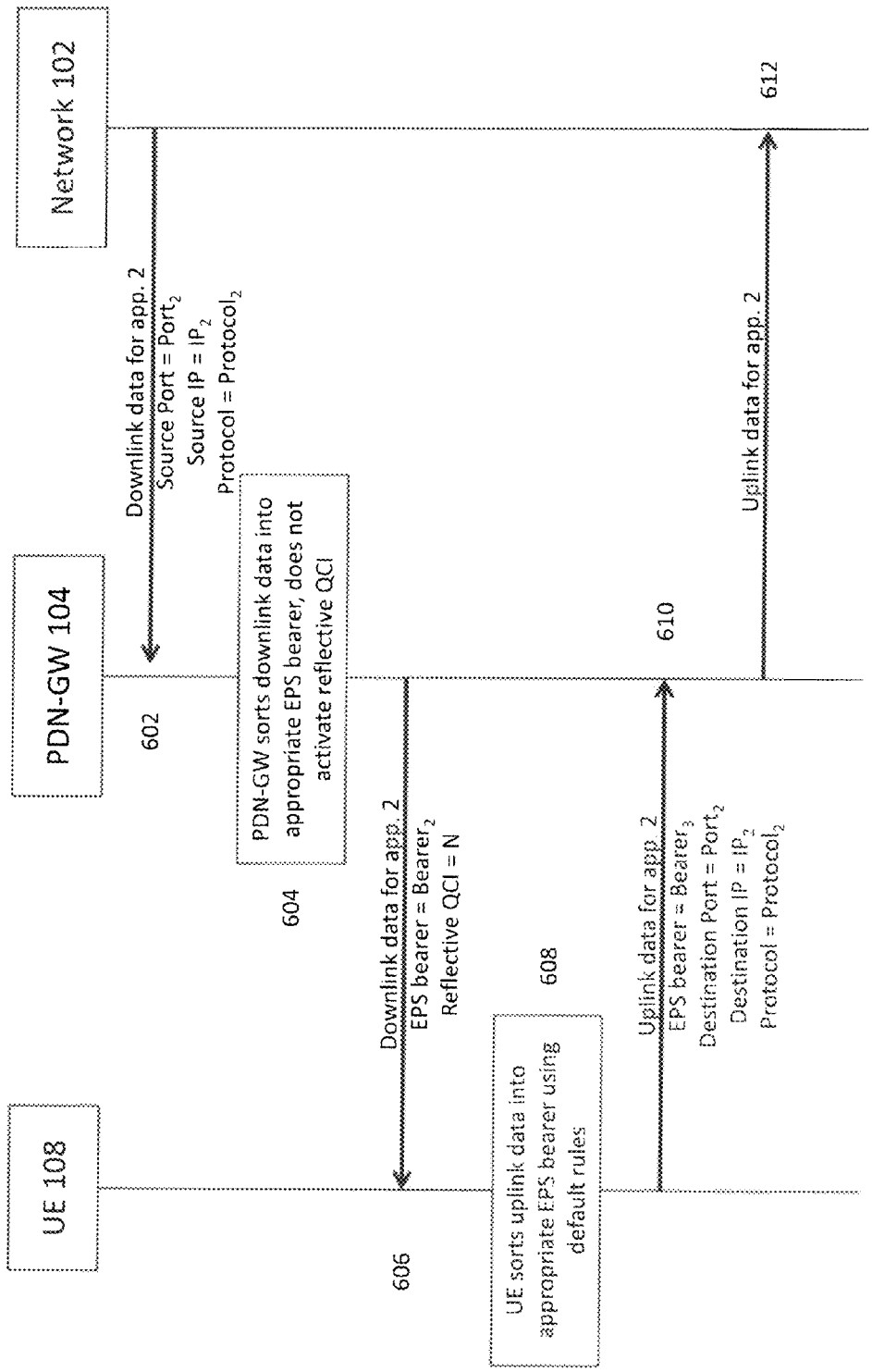
FIG. 6 is a signaling diagram showing a signal flow between a network, a PDN-GW and a UE when reflective bearer treatment is not requested, according to some embodiments.

FIG. 6 is a signaling diagram showing a signal flow when reflective bearer treatment is not requested. Network 102 sends a stream of at least one packet associated with downlink data for application 2 to PDN-GW 104 at 602. This stream of packets is characterized by a source port value of Port$_2$, a source IP address of IP$_2$ and a protocol type of Protocol$_2$. At 604, PDN-GW 104 sorts the downlink data stream for application 2 into the appropriate EPS bearer, and does not request reflective bearer treatment. PDN-GW 104 can sort the downlink data stream using Gateway Bearer Sorter 106 and TFTs, as described above. At 606, PDN-GW 104 can forward the downlink data stream using EPS Bearer$_2$, with the Reflective QCI marker marked "no." When UE 108 receives this data stream at 608, UE detects the 3-tuple associated with the downlink data for application 2 (Port$_2$, IP$_2$, Protocol$_2$), but does not add this 3-tuple to the Reflective Bearer List 212 since the Reflective QCI marker was marked "no". When UE 108 generates and sends a responding packet at 610, UE 108 sorts the uplink data stream into the appropriate EPS bearer using default rules, such as TFTs signaled to UE 108 from PDN-GW 104. At 612, PDN-GW 104 can then forward the uplink data, addressed to Port$_2$ and IP$_2$ using Protocol$_2$, to Network 102.

In certain embodiments, the 3-tuples stored in Bearer List 212 can be extended with a time stamp to indicate the time at which the last packet from a certain Source IP, Source Port and using a certain protocol type was received (i.e., this field is updated each time a packet from Source IP/Source Port/Protocol type is received). This information can be used by UE 108 to remove 3-tuples after a predefined time.

There are multiple ways for PDN-GW 104 to signal to UE 108 that reflective bearer treatment is requested. Some example methods include: using reserved QCI values, using reserved ARP values, and/or using a new explicit indication for reflective bearer treatment.

PDN-GW 104 and UE 108 can use reserved QCI values to indicate that reflective bearer treatment is requested. As described in the background section, the LTE standard currently defines nine QCI values corresponding to different QoS levels. Further QCI values can be defined which can indicate to a UE that packets received via a bearer configured with one of these reflective QCIs shall trigger reflective EPS bearer treatment as described above.

PDN-GW 104 and UE 108 can also use reserved ARP values to indicate that reflective bearer treatment is requested. As described in the background section, the LTE standard currently uses ARP for the allocation of bearer resources at session startup or during handover mechanisms, or for deciding which bearers should be preserved in case of a congestion situation. Currently, once the bearer is established, the ARP typically has no impact on scheduling or packet-handling mechanisms. However, the LTE standard can be enhanced to define further ARP values designated as reflective ARP values. These reflective ARP values can be used to indicate to the UE that packets received via a bearer configured with one of these reflective ARP values shall trigger reflective bearer treatment for the related bearer. Currently, ARP values are not transmitted to the UE—they are used only for network communications between other nodes. The LTE standard would have to be extended to enabling sending of ARP to UEs.

Finally, instead of reusing existing parameters such as QCI or ARP, a new explicit indication can be built into the 3GPP LTE standard for communications between the UE and the network. During bearer establishment, the network could add a new "reflective EPS bearer indication" to bearers to indicate to the UE that packets received via this bearer should receive reflective bearer treatment.

Figure 7:
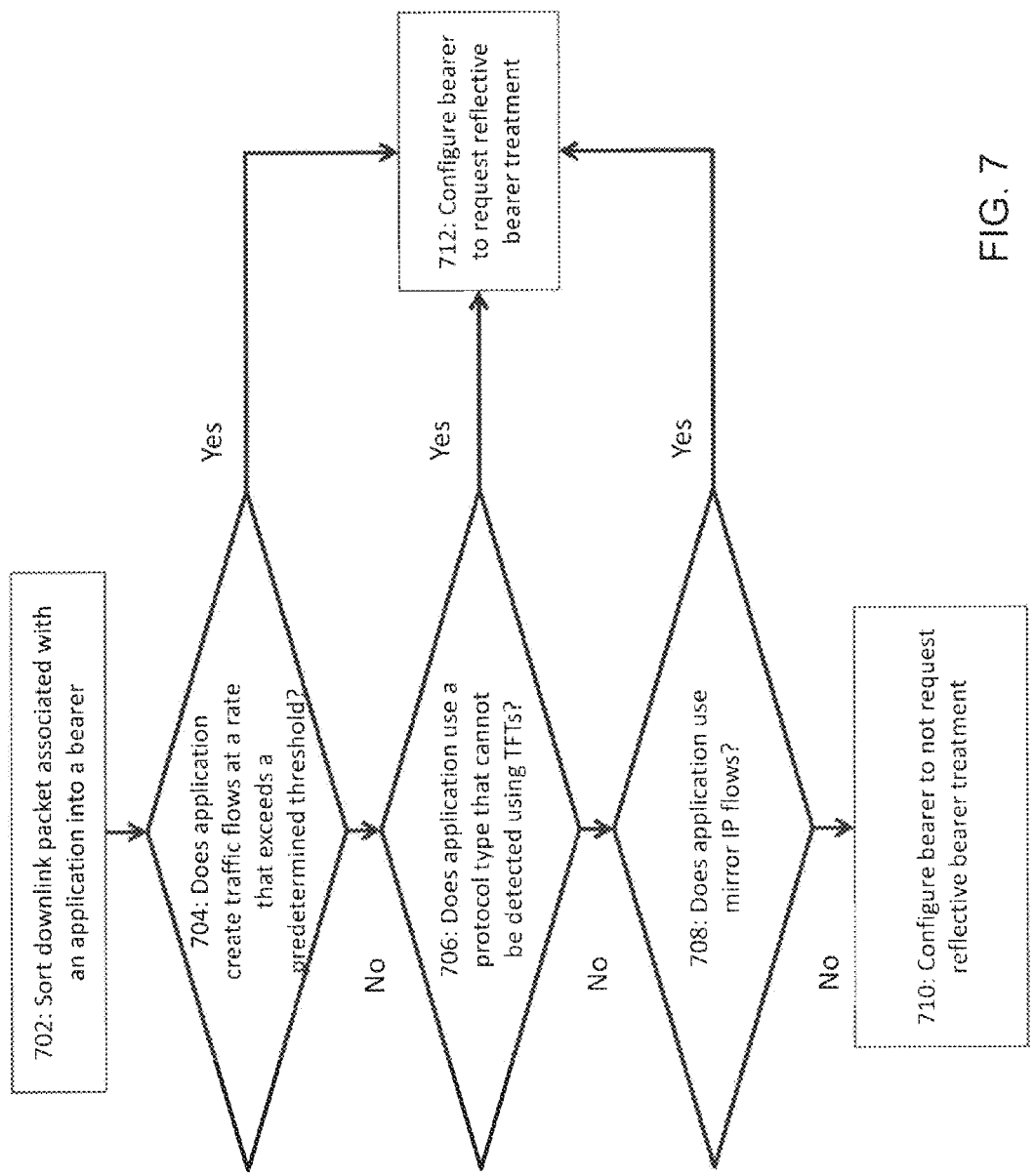
FIG. 7 is a flow-chart illustrating the procedure used by a PDN-GW to determine whether or not to request reflective bearer treatment for a bearer, according to some embodiments.

In certain embodiments, PDN-GW 104 can be configured to automatically determine whether or not to request reflective bearer treatment for particular data flows, and to request such treatment as appropriate using the methods outlined above. FIG. 7 is a flow-chart illustrating logic PDN-GW 104 can follow to determine whether or not to request reflective bearer treatment. At 702, PDN-GW 104 can sort a new downlink packet associated with an application into a bearer, perhaps using either TFTs or DPI, as discussed above. At 704, PDN-GW 104 can determine whether the application associated with the downlink packet is expected to create traffic flows at a rate that exceeds a certain predetermined threshold. In certain embodiments, this predetermined threshold may be adjusted by a system administrator. If the rate at which new IP flows are expected to be created exceed the predetermined threshold, PDN-GW 104 can automatically configure the bearer to request reflective bearer treatment at 712. At 706, PDN-GW 104 can determine whether a protocol type associated with the downlink packet and/or the application is of a type that cannot be detected using TFTs. For example, as discussed above, TFTs generally cannot distinguish between traffic associated with certain applications (such as Skype) from traffic associated with other applications (such as web chatting), even though the two applications require different QoS. In such cases, Deep Packet Inspection (DPI) is required to sort packets into appropriate bearers. If PDN-GW 104 determines that the downlink packet is associated with an application that can only be distinguished using DPI, PDN-GW 104 can also configure the bearer to request reflective bearer treatment at 712. At 708, PDN-GW 104 can determine whether the application associated with the downlink packet uses mirror IP flows, i.e., uses the same Internet Protocol (IP) address, port and protocol type for both downlink traffic and uplink traffic. If so, PDN-GW 104 can automatically configure the bearer to request reflective bearer treatment at 712. If none of the conditions checked at 704, 706 and 708 are true, PDN-GW 104 can configure the bearer to not request reflective bearer treatment. Although FIG. 7 and the above discussion assume three types of checks in a sequential order, it is to be understood that the conditions checked at 704, 706 and 708 may be checked in any order (i.e., 704 need not precede 706, and 706 need not precede 708), and that any of the conditions checked at 704, 706, and 708 may be omitted.

Furthermore, additional conditions may be added to the conditions specified in FIG. 7. As discussed above, a network operator can configure PDN-GW 104 to request reflective bearer treatment when it senses that the network is congested (for example, the volume of traffic passing between PDN-GW 104 and UE 108 or other UEs is higher than a predetermined threshold). When the network is congested, PDN-GW 104 can push certain services into a specified bearer having a "low" QoS, and request reflective bearer treatment for this bearer. In this way, PDN-GW 104 can not only obviate the need for PDN-GW 104 to update UE 108 with TFTs, but can also save UE 108 from having to perform DPI for uplink traffic. PDN-GW 104 can also determine to request reflective bearer treatment for certain subscribers and not others. For example, in the case where the network is congested (discussed above), PDN-GW 104 can push certain services into a low QoS bearer requesting reflective bearer treatment for certain "regular" subscribers, but leave the QoS and bearers unchanged (and not request reflective bearer treatment) for certain "gold" subscribers, who may have paid more for preferential treatment as compared to regular subscribers.

External interface 202 in UE 108 can be a transceiver including a transmitter and a receiver. The transmitter and the receiver can be integrated into a single chip or can be embodied in separate chips. The transceiver in External Interface 202 can also include an interface that provides an input and/or output mechanisms to communicate with other network devices. The interface 202 can measure the wireless signal strengths of wireless interfaces such as base stations and access points. The interface 202 can be implemented in hardware to send and receive signals in a variety of mediums, such as optical, copper, and wireless, and in a number of different protocols some of which may be non-transient.

The modem 220 can be configured to implement modulation and framing of signals according to one or more communication standards. The communication standards include the cellular standards defined under 3GPP.

The wireless interface selection module 222 can be configured to select a wireless interface from which to receive network services. The wireless interfaces can include interfaces to different types of communication networks, including cellular networks and WLANs. Cellular networks can include LTE networks. A wireless interface for LTE networks can include a base station such as an eNodeB; a wireless interface for WLANs can include an access point.

The wireless interface selection module 222 can select the serving wireless interface by analyzing data load information associated with wireless interfaces. In certain embodiments, the wireless interface selection module 222 can be configured to attach to a wireless interface handling the least amount of data traffic and/or with more available resources. In certain embodiments, the wireless interface selection module 222 can also analyze additional information to decide to which wireless interface to connect. For example, the wireless interface selection module 222 can use one or more of the following: the load condition associated with the candidate wireless interfaces, the wireless signal strength associated with the candidate wireless interfaces, and a configuration status on the wireless interface selection module 222 indicating whether the UE 108 favors the cellular network or the WLAN.

The wireless interface selection module 222 can be implemented in software using memory 210 such as a non-transitory computer readable medium, a programmable read only memory (PROM), or flash memory. The software can run on a processor 208 that executes instructions or computer code. The wireless interface selection module 222 may also be implemented in hardware using an application specific integrated circuit (ASIC), programmable logic array (PLA), or any other integrated circuit.

The GUI interface 218 can provide communication with an input and/or output mechanism to communicate with UE users. UE users can use input/output devices to send/receive data to/from the UE 108 over the GUI interface 218. Input/output devices can include, but are not limited to, a keyboard, a screen, a touch screen, a monitor, and a mouse.

The GUI interface 218 can operate under a number of different protocols. The GUI interface 218 can be implemented in hardware to send and receive signals in a variety of mediums, such as optical, copper, and wireless.

The UE 108 described above can communicate with a plurality of radio access networks using a plurality of access technologies and with wired communication networks. The UE 108 can be a smart phone offering advanced features and capabilities, such as word processing, web browsing, gaming, e-book capabilities, an operating system, and a full keyboard. The UE 108 may run an operating system such as Symbian OS, iPhone OS, RIM's Blackberry, Windows Mobile, Linux, Palm WebOS, and Android. The screen may be a touch screen that can be used to input data to the UE 108 and the touch screen can be used instead of the full keyboard. The UE 108 may have the capability to run applications or communicate with applications that are provided by servers in the communication network. The UE 108 can receive updates and other information from these applications on the network.

The UE 108 also encompasses many other devices such as televisions (TVs), video projectors, set-top boxes or set-top units, digital video recorders (DVR), computers, netbooks, laptops, and any other audio/visual equipment that can communicate with a network. The UE 108 can also keep global positioning coordinates, profile information, or other location information in its stack or memory. The UE 108 can have a memory such as a computer readable medium, flash memory, a magnetic disk drive, an optical drive, a programmable read-only memory (PROM), and/or a read-only memory (ROM). The UE 108 can be configured with one or more processors 208 that process instructions and run software that may be stored in memory 210. The processor 208 can also communicate with the memory 210 and interfaces to communicate with other devices. The processor 208 can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 108 can also provide a variety of user interfaces (managed using GUI Interface 218) such as a keyboard, a touch screen, a trackball, a touch pad, and/or a mouse. The UE 108 may also include speakers and a display device in some embodiments.

Any of the network components specified in this disclosure, including PDN-GW 104, can be implemented, at least in part, in a network device in some embodiments. This network device can implement multiple and different integrated functionalities. In some embodiments, one or more of the following additional functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA). The CVR scheme can be implemented on network devices of the same type, implementing the same set of functionalities.

In certain embodiments, the functionalities are provided by a combination of hardware and software in the network device. General purpose hardware can be configured in the network device to provide one or more of these specialized functionalities. If the network device is serving as a gateway, the gateway can be implemented as any combination of the following: an xGSN, an xGW, an xGW-SGW, and an xGW-PGW.

Figure 8:
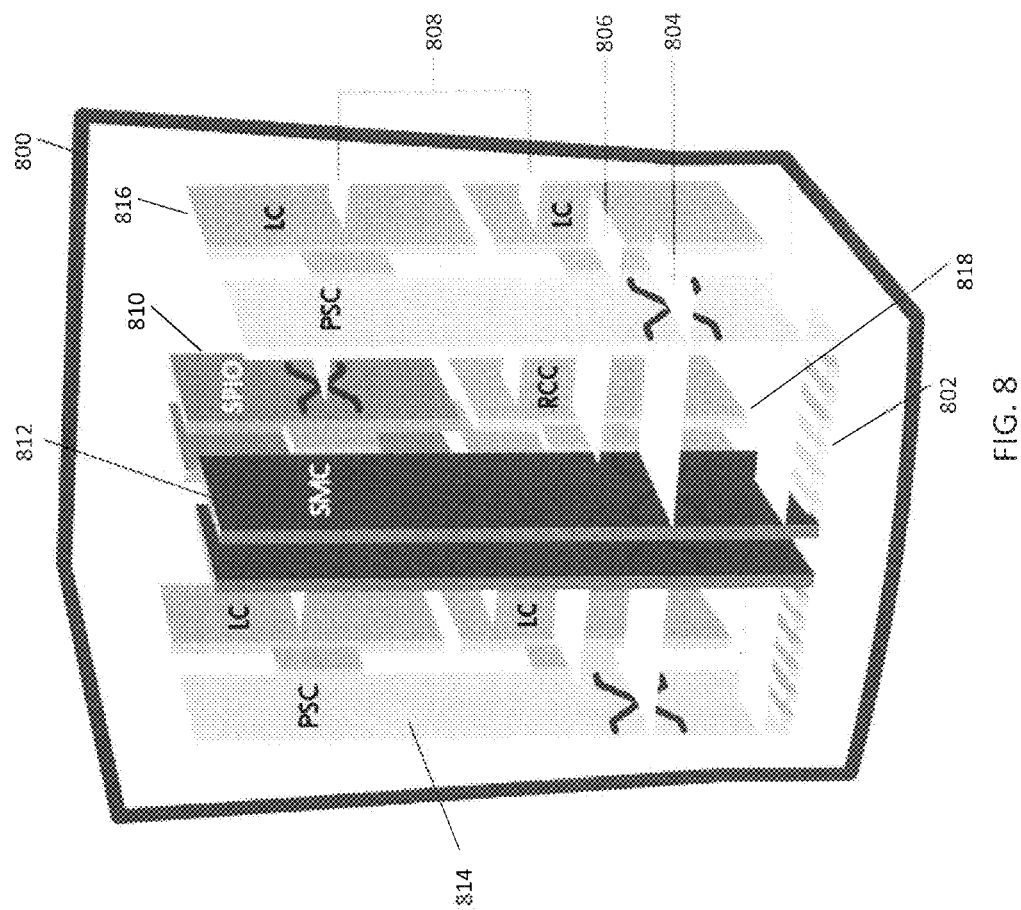
FIG. 8 illustrates the implementation of a network device, according to some embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 8 illustrates the implementation of a network device 800 in accordance with some embodiments. The network device 800 includes slots 802 for loading application cards and line cards. A midplane can be used in the network device 800 to provide intra-network device communications, power connections, and transport paths between the various installed cards. The midplane can include buses such as a switch fabric 804, a control bus 806, a system management bus, a redundancy bus 808, and a time division multiplex (TDM) bus. The switch fabric 804 is an IP-based transport path for user data throughout the network device 800 implemented by establishing inter-card communications between application cards and line cards. The control bus 806 interconnects the control and management processors within the network device 800. The network device management bus provides management of system functions such as supplying power, monitoring temperatures, board status, data path errors, card resets, and other failover features. The redundancy bus 808 provides transportation of user data and redundancy links in the event of hardware failures. The TDM bus provides support for voice services on the system.

The network device 800 supports at least four types of application cards: a switch processor I/O card (SPIO) 810, a system management card (SMC) 812, a packet service card (PSC) 814, and a packet accelerator card (not shown). Other cards used in the network device 800 include line cards 816 and redundant crossbar cards (RCC) 818. The line cards 816, when loaded in the network device 800, provide input/output connectivity to the network and other devices, as well as redundancy connections. The line cards 816 include interfaces to the network through Ethernet, Fiber Optic, and/or any other communication mediums. The redundant crossbar card (RCC) 818 includes a non-blocking crossbar and connections to each of the cards in the network device 800. This allows a redundant connection to be made through the redundant crossbar card 818 from any one card to any other card in the network device 800. The SPIO card 810 serves as a controller of the network device 800 and is responsible for such things as initializing the network device 800 and loading software configurations onto other cards in the network device 800.

The system management card (SMC) 812 and switch processor card (not shown) are system control and management cards for managing and controlling other cards in the network device 800. The packet accelerator card (PAC) and packet service card (PSC) 814 provide packet processing, context processing capabilities, and forwarding capabilities among other things. The PAC and PSC 814 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device 800 such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The software in the network device 800 can be divided into a series of tasks that perform specific functions. These tasks communicate with each other as needed to share control and data information throughout the network device 800. A task is a software process that performs a specific function related to system control or session processing. Three types of tasks operate within the network device 800 in some embodiments: critical tasks, controller tasks, and manager tasks. The critical tasks control functions that relate to the ability of the network device 800 to process calls such as network device initialization, error detection, and recovery tasks. The controller tasks mask the distributed nature of the software from the user and perform tasks such as monitoring the state of subordinate manager(s), providing for intra-manager communication within the same subsystem, and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device (e.g., network device 800) include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost.

User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node (e.g., user equipment 108), the session subsystem can setup a MIPv4 termination and setup a PMIPv6 session towards the core network. A session manager can track the mapping of the sessions and processing to provide the emulation and inter-working between the networks. A database can also be used to map information between the sessions, and store, for example, NAI, HoA, AE information in some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power.

Figure 9:
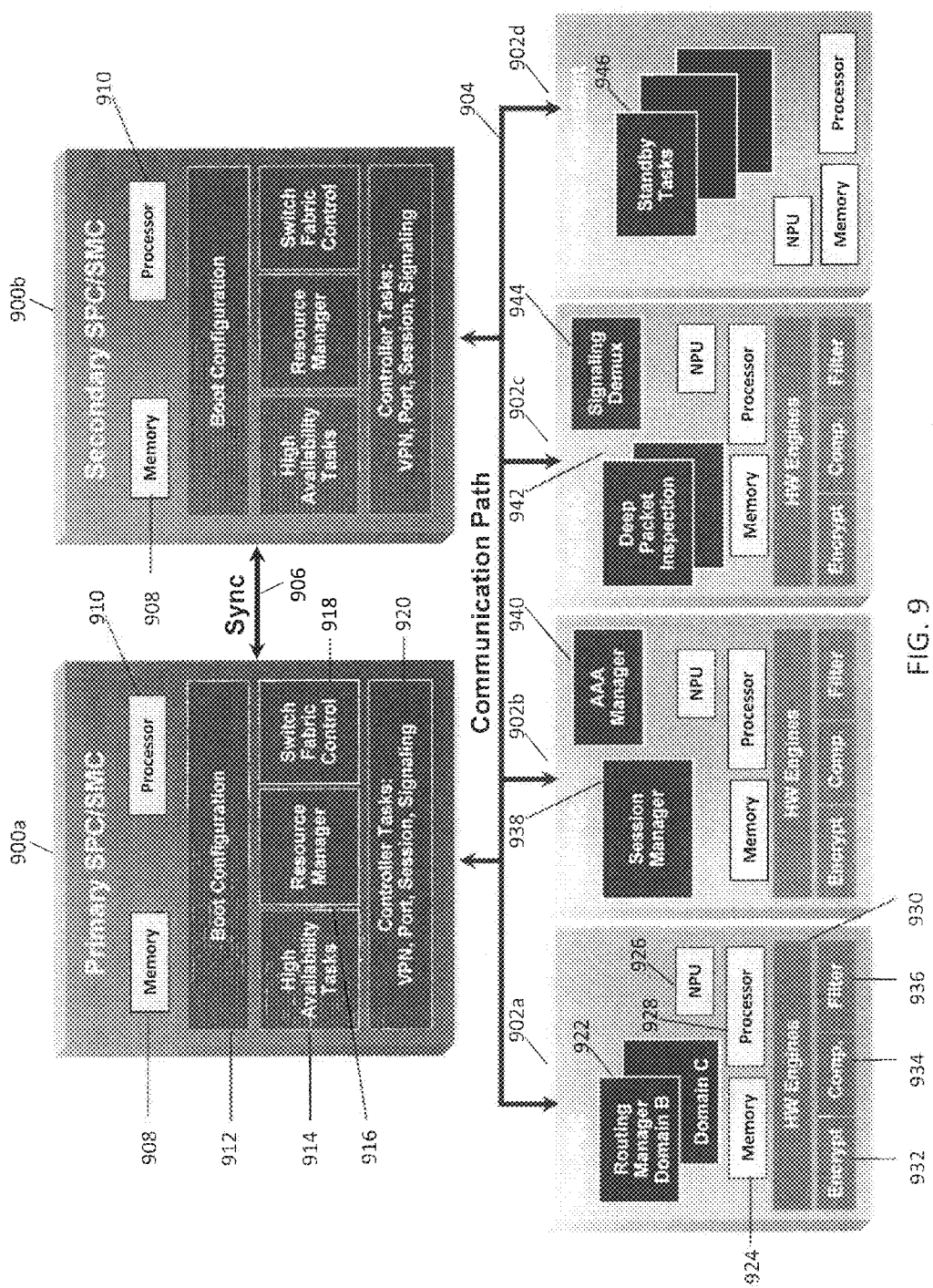
FIG. 9 is a logical view of the software architecture of a network device, according to some embodiments.

FIG. 9 illustrates a logical view 900 of the software architecture of a network device (e.g., network device 800) in accordance with certain embodiments. As shown, the software and hardware can be distributed within the network device and across different circuit boards, processors, and memory. FIG. 9 includes a primary switch processor card (SPC)/system management card (SMC) 900a, a secondary SPC/SMC 900b, PAC/PSC 902a-902d, a communication path 904, and a synchronization path 906. The primary SPC/SMC 900a and the secondary SPC/SMC 900b each includes a memory 908, a processor 910, a boot configuration 912, high availability tasks 914, resource manager 916, switch fabric control 918, and controller tasks 920.

The SPC/SMC 900 (both primary and secondary) manages and controls the network device including the other cards in the network device. The SPC/SMC 900 can be configured in a primary and secondary arrangement that provides redundancy and failsafe protection. The modules or tasks running on the SPC/SMC 900 are related to network device wide control and management. The boot configuration task 912 includes information for starting up and testing the network device. The network device can also be configured to startup in different configurations and providing different implementations. These can include which functionalities and services are capable of running on the SPC/SMC 900. The high availability task 914 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 900 or a PAC/PSC 902, while some processor intensive tasks can also be performed across multiple PACs/PSCs to utilize multiple CPU resources. Distribution of these tasks is invisible to the user. The switch fabric control 918 controls the communication paths in the network device. The controller tasks module 920 can manage the tasks among the resources of the networks to provide, for example, VPN services, assign ports, and create, delete, and modify sessions for UE 108.

The PAC/PSC 902 is a high-speed processing card that is designed for packet processing and the tasks involved with providing various network functionalities on the network device. The PAC/PSC 902 include a memory 924, a network processing unit (NPU) 926, a processor 928, a hardware engine 930, an encryption component 932, a compression component 934, and a filter component 936. Hardware engines 930 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 902 is capable of supporting multiple contexts. The PAC/PSC 902 is also capable of running a variety of tasks or modules. PAC/PSC 902a provides routing managers 922 with each covering routing of a different domain. PAC/PSC 902b provides a session manager 938 and an AAA manager 940. The session manager 938 manages one or more sessions that correspond to one or more UE 108. A session allows a UE 108 to communicate with the network for voice calls and data. The AAA manager 940 manages accounting, authentication, and authorization with an AAA server in the network. PAC/PSC 902c provides a DPI task 942 and a signaling demux 944. The DPI task 942 provides inspection of packet information beyond layer 4 for use and analysis by the network device. The signaling demux 944 can provide scalability of services in combination with other modules. PAC/PSC 902d provides redundancy through standby tasks 946. Standby tasks 946 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, different types of UEs can be used.

What is claimed is:

1. A network apparatus comprising:
    a computer processor in communication with an interface, the computer processor to:
        determine that a bearer should be configured as a reflective bearer;
        cause an indication that the bearer is to be a reflective bearer to be sent to a user equipment (UE);
        send at least one downlink packet received at the network apparatus to the UE via the bearer; and
        wherein the indication that the bearer is to be a reflective bearer causes the UE to store flow information comprising a source Internet Protocol (IP) address, source port, and protocol type from the at least one downlink packet and to send uplink packets matching the flow information via the bearer.

2. The network apparatus of claim 1, wherein the computer processor is further to determine that the bearer should be configured as a reflective bearer based on a rate at which an application associated with the bearer is expected to create new traffic flows.

3. The network apparatus of claim 1, wherein the computer processor is further to determine that the bearer should be configured as a reflective bearer when an application for which packets will be sorted onto the bearer cannot be represented using Traffic Flow Templates (TFTs), the TFTs comprising rules that sort packets into bearers based on information in packets' headers.

4. The network apparatus of claim 1, wherein the computer processor is further to determine that the bearer should be configured as a reflective bearer when an application for which packets will be sorted onto the bearer is configured to use the same Internet Protocol (IP) address, port, and protocol type for downlink traffic and uplink traffic.

5. The network apparatus of claim 1, wherein the indication that the bearer is to be a reflective bearer comprises at least one of a QoS Class Identifier (QCI) parameter or an Allocation and Retention Priority (ARP) parameter.

6. The network apparatus of claim 1, wherein the computer processor is further to:
    determine that a second downlink packet should not be sent via a bearer configured as a reflective bearer; and
    determine which bearer via which the second downlink packet should be sent based on a set of Traffic Flow Templates (TFTs), the TFTs comprising rules that sort packets into bearers based on information in packets' headers.

7. The network apparatus of claim 1, wherein the network apparatus includes a Packet Data Network Gateway (PDN-GW).

8. A method, comprising:
    determining, by a network apparatus, that a bearer should be configured as a reflective bearer;
    sending, by the network apparatus, an indication that the bearer is to be a reflective bearer to a user equipment (UE);
    sending, by the network apparatus, at least one downlink packet received at the network apparatus to the UE via the bearer; and
    wherein the indication that the bearer is to be a reflective bearer causes the UE to store flow information comprising a source Internet Protocol (IP) address, source port, and protocol type obtained from the at least one downlink packet and to send uplink packets matching the flow information via the bearer.

9. The method of claim 8, wherein the determination is based on a rate at which an application associated with the bearer is expected to create new traffic flows.

10. The method of claim 8, wherein the determination is based on whether an application associated with the bearer can be represented using Traffic Flow Templates (TFTs), the TFTs comprising rules that sort packets into bearers based on information in packets' headers.

11. The method of claim 8, wherein the determination is based on whether an application associated with the bearer is configured to use the same Internet Protocol (IP) address, port, and protocol type for downlink traffic and uplink traffic.

12. The method of claim 8, wherein the indication that the bearer is to be a reflective bearer includes at least one of a QoS Class Identifier (QCI) parameter or an Allocation and Retention Priority (ARP) parameter.

13. The method of claim 8, further comprising:
    determining, at the network apparatus, that a second downlink packet should not be sent via a reflective bearer; and
    determining which bearer via which the second downlink packet should be sent based on a set of Traffic Flow Templates (TFTs), the TFTs comprising rules that sort packets into bearers based on information in packets' headers.

14. The method of claim 8, wherein the network apparatus includes a Packet Data Network Gateway (PDN-GW).

15. At least one non-transitory computer readable media comprising instructions that when executed by one or more processors are to:
determine that a bearer should be configured as a reflective bearer;
send an indication that the bearer is to be a reflective bearer to a user equipment (UE);
send at least one downlink packet received at the network apparatus to the UE via the bearer; and
wherein the indication that the bearer is to be a reflective bearer causes the UE to store flow information comprising a source Internet Protocol (IP) address, source port, and protocol type obtained from the at least one downlink packet and to send uplink packets matching the flow information via the bearer.

16. The at least one media of claim 15, wherein the determination is based on a rate at which an application associated with the bearer is expected to create new traffic flows.

17. The at least one media of claim 15, wherein the determination is based on whether an application associated with the bearer can be represented using Traffic Flow Templates (TFTs), the TFTs comprising rules that sort packets into bearers based on information in packets' headers.

18. The at least one media of claim 15, wherein the determination is based on whether an application associated with the bearer is configured to use the same Internet Protocol (IP) address, port, and protocol type for downlink traffic and uplink traffic.

19. The at least one media of claim 15, wherein the indication that the bearer is to be a reflective bearer includes at least one of a QoS Class Identifier (QCI) parameter or an Allocation and Retention Priority (ARP) parameter.

20. The at least one media of claim 15, wherein the instructions when executed by one or more processors are further to:
determine that a second downlink packet should not be sent via a reflective bearer; and
determine which bearer via which the second downlink packet should be sent based on a set of Traffic Flow Templates (TFTs), the TFTs comprising rules that sort packets into bearers based on information in packets' headers.

* * * * *